Patented June 23, 1942

2,287,737

UNITED STATES PATENT OFFICE 2,287,737

TREATMENT OF WHEAT AND KINDRED CEREALS

Erich Gustav Huzenlaub, Brentford, England, assignor of one-half to John Heron Rogers, Kenley, England; Francis Heron Rogers executor of said John Heron Rogers, deceased No Drawing. Application February 21, 1940, Serial No. 320,212. In Great Britain March 16, 1939

10 Claims. (Cl. 99—80)

This invention relates to improvements in the treatment of wheat and kindred cereals prior to milling, and has for its object the production of a wheat grain for the purpose of milling a white flour or semolina and such other mill products in which the health sustaining qualities are increased over those available to-day in flours coming under the general category of "white" flour or "highly milled" products.

Wheat grains in common with many cereals have an embryo and external coatings or layers most of which contain vitamins or vitamin carriers, salts, proteins and fatty matters, the whole or parts of which are soluble in water and all of which are nutritious and eminently desirable in any food. The interior of the wheat kernel or endosperm is almost wholly starch and the grains thereof lend themselves to easy milling and the production of white flour when all or a relatively large proportion of the pericarp, spermoderm, perisperm, aleuron layer and the germ are stripped away and sifted out of the mass. Some of the said above outer parts of the grain do not readily lend themselves to flour production, since in milling they flake and form laminae or bran and are therefore easy to separate. If these layer products are milled and not separated or, if separated, added back to the white flour, such flour produces a bread which is darker in colour than that produced from the white flour alone.

It is well known that despite well founded contrary advice the majority of bread eaters desire bread as white as can be obtained and the miller therefore takes care to use milling methods and bolting cloths that eliminate all traces of bran and embryo, which otherwise would degrade the colour.

The food authorities of many lands have recognised the injurious absence of bran in white flour, and in some countries white bread is prohibited. The present invention enables a very white flour to be produced, but by treatment a proportion of the salts, nitrogenous matters and vitamins or vitamin carriers of the outer layers and the embryo are caused to dissolve in water and be absorbed by the endosperm or starch, whereby the resultant milled white flour contains those desirable qualities that otherwise are only found in brown or darker shaded qualities of flour and other mill products.

The invention consists in a process for the treatment of wheat and like cereals for the purpose of obtaining an improved product, which consists in removing air from the grain and then soaking the whole grain by steeping it in hot or warm water to dissolve out solutes, and applying pressure to the steeping fluid so as to force the solutes into the endosperm or starch particles and enrich it with said fluids, removing the grain from the solution and drying it to a water content desirable for milling, and employing the solution for the treatment of further grain up to the point of solution saturation.

In carrying the invention into effect and in the preferred manner, the wheat or kindred cereal for treatment is first cleaned in the usual manner preparatory to milling, and is charged into a stationary vessel or preferably a rotatable autoclave, the latter being fitted with a hinged or removable lid and temperature and pressure recording instruments. The autoclave is now closed and preferably a high vacuum created therein to eliminate imprisoned air in the grains and intergrain spaces. When approximately a drop of 28″ of mercury gauge pressure is reached with barometer at 29″ or 30″ hot water is admitted until the autoclave is nearly full or, at any rate, the whole of the grain is submerged.

If the intended use of the grain is for the purpose of being milled into flour with the ultimate object of the said flour being made into bread and baked, then the diastase should not be seriously affected by heat and the temperature of the water within the autoclave should not exceed the temperature at which protein or the albumen therewith is affected adversely. The upper limit of this temperature is approximately 60° C. On the other hand the critical temperature of coagulation or degradation varies with various forms of grain and depends in some measure upon the age of the crop treated and the type of protein present. Thus it may be convenient to treat the cereal at temperatures which are considerably below 60° C. Thus varying temperatures allied to those employed when conditioning wheat prior to milling may be used with impunity, i. e. between 20° C. and 45° C. If treatment takes place within the measure of the above temperatures the protein remains substantially unaffected and permeation of beneficial constituents through the endosperm of the cereal results.

After the vessel is water filled, pressure is applied, such as by pumping in air or water. If air or an inert gas or gases be excluded and the autoclave filled with water, water pressure may be applied by causing further supplies to react against a water tight spring resisted plunger let into the wall of the autoclave. The period of steeping and the pressure applied are in some degree interchangeable factors. Thus a half hour hot steeping at 100–125 lbs. per sq. in. produces excellent results, but if the pressure and/or temperature be raised or lowered the period may be lessened or increased at an approximate rate of say an increase of each 100 lbs. equals a decrease of approximately five minutes, and a decrease of say 25 lbs. equals an increase of about five to ten minutes; such variations, however, are influenced extensively by the characteristics, i. e. the age, quality, size and type, of the grain treated. The grain so treated is then discharged from the autoclave, whilst the steeping water, if withdrawn, is returned to the autoclave for treatment of a further batch. The steeping water may be employed several times and, should it become discoloured as the result of repeated use, it can be filtered through charcoal, activated or otherwise, prior to its reuse. In practice it is better to employ two filters in tandem the first which may employ any suitable permeable filtering medium for the separation of suspended impurities, and the second filter employed for eliminating colouring matter, or colloidal impurities. This solution is added to from time to time, since the volume decreases at each successive treatment of cereal. The added water may be sufficient to provide the additional solvent extraction properties necessary. There is, however, a point of saturation or discolouration of the solution with salts and other matters, and when this takes place, dilution or replacement may become essential. The grain after removal from the treatment vessel is placed into a rotary drying machine where it is subjected to warm vacuum drying until the moisture content is reduced to say 16% and the temperature allowed to drop to 43° C. In such condition wheat, for instance, is ready for milling, and this saves the miller the cost and necessity of tempering the grain such as is usually employed, prior to wheat flour milling.

The grain prior to milling if treated at a temperature of 60° C. or thereabouts tends to become translucent, in which condition the starch loses its granular white appearance in the grain and the particles become gelatinised and dry with a translucent aspect. In this condition the grain does not mill with the same readiness as with the grain treated at the lower temperatures, but on the other hand it is a product which is relatively rich in absorbed vitamins and the water retention capacity of the flour produced from it is great, and this is useful in baking. When, however, the grain is treated at the lower temperatures, say between 20° and 45° C., then gelatinisation of the starch is substantially avoided and the diastase suffers no degradation and there is a tendency for the grain to mill easier and the bran ceases to present difficulties by reason of being fluffy.

I claim:

1. A process for the treatment of cereal grain containing starch particles, for the purpose of obtaining an improved product, which comprises the steps of removing entrained air from the grain by subjecting it to a high vacuum treatment, soaking the whole of the grain in water at a raised temperature to dissolve out at least a substantial portion of the nutritive solutes; applying fluid pressure so as to force the solution into said starch particles and enrich them with a substantial portion of said solutes, and removing the grain from the solution and drying it.

2. The process defined in claim 1, wherein the water is maintained at a temperature between 20° and 45° C. during the soaking step.

3. The process defined in claim 1, wherein the enriched solution is used for the treatment of a further batch of grain.

4. The process defined in claim 1, wherein said grain is dried substantially to the condition of moisture content required for the milling of flour.

5. A process as claimed in claim 1 including the step of filtering the used steeping solution through charcoal to remove suspended impurities and eliminate colouring matter, prior to its reuse.

6. A process as claimed in claim 1 including the employment of the enriched solution for steeping treatment of further grain until it reaches a point of saturation when dilution becomes essential.

7. A process as claimed in claim 1, including the employment of the enriched solution for steeping treatment of further grain until it reaches a point of discoloration with salts and other matters where replacement becomes essential.

8. A process for the treatment of cereal grains having a central starch containing portion enclosed by a portion containing water soluble nutritive substances, which comprises subjecting the whole grain to a high vacuum treatment to remove entrained air, steeping the whole grain in water at a temperature sufficiently high to extract the soluble nutritive substances, but sufficiently low to avoid gelatinizing the starch, applying sufficiently high fluid pressure to force the nutritive substance bearing solution into the starch portion of said grain, so as to enrich the starch portion with a substantial portion of the nutritive substance content of said grain, and then subjecting the grain to a drying operation.

9. The process defined in claim 8, wherein fluid pressures ranging between 100 to 125 pounds per square inch are employed to force the solution into the starch particles.

10. A process as claimed in claim 8 including the employment of the enriched solution for treatment of further grain up to the point of solution saturation.

ERICH GUSTAV HUZENLAUB.